(12) United States Patent
Hodges (10) Patent No.: US 10,845,479 B1
(45) Date of Patent: Nov. 24, 2020

(54) MOVEMENT AND PRESENCE DETECTION SYSTEMS AND METHODS USING SONAR

(71) Applicant: SYNAPTICS INCORPORATED, San Jose, CA (US)

(72) Inventor: Richard Bradley Hodges, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/776,404

(22) Filed: Jan. 29, 2020

(51) Int. Cl.
 *G08B 13/00* (2006.01)
 *G01S 15/52* (2006.01)
 *G01S 7/53* (2006.01)

(52) U.S. Cl.
 CPC .............. *G01S 15/526* (2013.01); *G01S 7/53* (2013.01)

(58) Field of Classification Search
 CPC .................................................. G01S 15/526
 USPC .......... 367/93, 101; 340/475, 539.15, 539.23
 See application file for complete search history.

(56) References Cited

U.S. PATENT DOCUMENTS

| | | | |
|---|---|---|---|
| 7,158,643 B2 * | 1/2007 | Lavoie | H04S 7/301 381/303 |
| 2015/0016224 A1 * | 1/2015 | Houshuyama | G01S 7/52 367/93 |

OTHER PUBLICATIONS

Swen Müller et al.ss, "Transfer-Function Measurement with Sweeps", pp. 1-52.

* cited by examiner

*Primary Examiner* — Tai T Nguyen
(74) *Attorney, Agent, or Firm* — Haynes and Boone, LLP (57) ABSTRACT

A method for detecting presence of a person includes emitting, by a speaker of a device, a plurality of ultrasonic ping signals, receiving, by a microphone of the device, a plurality of reflected ultrasonic ping signals, and processing the received reflected signals to determine a presence of a person within a predetermined distance of the device. The processing includes determining changes in the reflected signals relative to the emitted signals by generating an impulse response by cross-correlating the received signals and the emitted signals, averaging the cross-correlated impulse response over a set time period, and generating a detection signal by subtracting the averaged cross-correlated impulse response from an instantaneous impulse response, applying a time gating function to select a portion of the detection signal corresponding to the reflected signal from the predetermined distance from the device, and applying gain compensation to the time gated detection signal to compensate signal falloff.

20 Claims, 8 Drawing Sheets

MOVEMENT AND PRESENCE DETECTION SYSTEMS AND METHODS USING SONAR

TECHNICAL FIELD

The present application generally relates to detecting a presence of a person or object. More particularly, it relates to movement and presence detection systems and methods using sonar.

BACKGROUND

Electronics devices such as laptop computers and other Internet of Things (IoT) devices often enter a sleep mode or suspended mode to conserve power. It is sometimes desirable for such electronic devices to wake up or turn on automatically in response to certain events, such as, for example, when a person is present or if there is movement of a person or an object within the vicinity of the device. Some conventional systems rely on speech detection to determine the presence of a person, but it is often difficult to reject arbitrary environmental sounds and may even require specific user interactions. Other techniques may rely on the use of cameras and image recognition, but such technique may have limitations based on lighting conditions. For example, it may work well when there is good lighting but may become unreliable in low-light conditions. Thermal cameras may be utilized to overcome issues with lighting, but they are generally more expensive. They are also not necessarily fully accurate because heat signatures can be left behind by a person, for example, if a person sits on a chair and gets up, the chair remains warm and the thermal camera will detect this heat. Additionally, privacy concerns must also be considered with cameras. Finally, some technologies may rely on the use of millimeter-wave radar but such radar systems are significantly more expensive. Therefore, a cost-effective technique for detecting the presence and/or movement of people or objects is desired.

SUMMARY

According to an embodiment of the present disclosure, a method for detecting presence of a person may include: emitting, by a speaker of a device, a plurality of ultrasonic ping signals; receiving, by a microphone of the device, a plurality of reflected ultrasonic ping signals; and processing the received reflected signals to determine a presence of a person within a predetermined distance of the device, wherein the processing includes: determining changes in the reflected signals relative to the emitted signals by: generating an impulse response by cross-correlating the received signals and the emitted signals; averaging the cross-correlated impulse response over a set time period; and generating a detection signal by subtracting the averaged cross-correlated impulse response from an instantaneous impulse response; applying a time gating function to select a portion of the detection signal corresponding to the reflected signal from the predetermined distance from the device; and applying gain compensation to the time gated detection signal to compensate signal falloff.

According to another embodiment of the present disclosure, a system, includes: a non-transitory memory; and one or more hardware processors coupled to the non-transitory memory and configured to read instructions from the non-transitory memory to cause the system to perform operations including: emitting, by a speaker of a device, a plurality of ultrasonic ping signals; receiving, by a microphone of the device, a plurality of reflected ultrasonic ping signals; and processing the received reflected signals to determine a presence of a person within a predetermined distance of the device, wherein the processing includes: determining changes in the reflected signals relative to the emitted signals by: generating an impulse response by cross-correlating the received signals and the emitted signals; averaging the cross-correlated impulse response over a set time period; and generating a detection signal by subtracting the averaged cross-correlated impulse response from an instantaneous impulse response; applying a time gating function to select a portion of the detection signal corresponding to the reflected signal from the predetermined distance from the device; and applying gain compensation to the time gated detection signal to compensate signal falloff.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Embodiments of the present disclosure and their advantages are best understood by referring to the detailed description that follows. Unless otherwise noted, like reference numerals denote like elements throughout the attached drawings and the written description, and thus, descriptions thereof will not be repeated. In the drawings, the relative sizes of elements, layers, and regions may be exaggerated for clarity.

DETAILED DESCRIPTION

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described.

The systems and methods of the present disclosure provide improved techniques for detecting the presence of a person or the movement of a person or certain objects within a set or predetermined distance from an electronic device. According to an embodiment of the present disclosure, the electronic device may be a laptop computer that enters a suspended mode, for example, sleep mode or turning off the display when the laptop is not being used or when the user steps away from the laptop to reduce power consumption. The laptop may be configured to awake from the sleep mode when it detects that the user has returned in front of the laptop. In other examples, the electronic device may be any of the many Internet of Things (IoT) devices such as, for example, a personal digital assistant device, like Alexa or Google Assistant that may be configured to awake when it detects that a person is nearby or passing by. In other embodiments, the IoT device may be an industrial control system like a smart thermostat and/or a safety device that may be configured to turn on or display information when a person is nearby. Thus, a display on such devices may remain off when no persons are nearby to see the display but turns on automatically as people come within a certain range.

In other embodiments, the IoT device may be a home security system, for example, a security camera that may turn on or start recording when it detects that a person or an object has come within a certain range of the device. Accordingly, the systems and methods that will be described herein the present disclosure may be applicable to any one or more of various electronic devices including IoT devices and computers. For purposes of simplifying the explanation in the disclosure, the electronic device may be referred to as a laptop but a person having ordinary skill in the art will appreciate that the laptop may be interchangeable with any one or more of the various electronic devices such as IoT devices having a speaker, a microphone, and a corresponding processor as will be described throughout the present disclosure.

Furthermore, consideration should be given to movement and presence detection systems that are cost effective and affordable to general consumers. For example, movement and presence detections may be feasible by using very expensive millimeter-wave radar, but such solutions may not be attractive to a ordinary household consumer. Accordingly, the techniques described herein provide an optimal solution that is inexpensive and affordable by many ordinary consumers.

According to an embodiment of the present disclosure, a standard built-in microphone and a speaker on a laptop computer is used to emit and receive inaudible ultrasonic audio signals to detect movement and/or the presence of one or more persons within a certain desired distance from the laptop. The distance may be selected and predetermined by the user so that the presence of the person is indicated only when the person is within the selected range. For example, in a busy environment where may people often pass by, it may be more desirable to set the distance closer, for example, one to three feet from the laptop to avoid triggering presence when a random person walks by. In other less busier environments such as in a small private office that is used by one or just a few persons, the distance may be set farther, for example, up to about eight feet. Consequently, when the person steps away and the laptop determines that the person is no longer within the selected range, the laptop may automatically enter the sleep state.

In some embodiments, the presence detection sonar may be used to wake up the laptop in combination with other wake up signals such as keyword voice activation where the laptop is configured to wake up when it hears a person speak a predetermined keyword. For example, the laptop may be in a power conserving low power sleep mode and may be configured to come out of the sleep mode to a pre-wakeup mode when it hears a person say the keyword. The pre-wakeup mode may be a mode that uses less power than a fully awake mode but has not yet returned to full power mode. In the pre-wakeup mode, the laptop may use the presence detection sonar to determine when a person has come within a set distance of the laptop and may return to full power mode when the presence of a person is determined.

Similarly, in other embodiments, the presence detection may be used to bring the laptop to a pre-wakeup mode from a sleep mode when the presence of a person is detected by the presence detection sonar. In this pre-wakeup low power mode, the laptop may be configured to listen for keyword voice activation to bring the laptop back to full power awake mode. As such, various combination of automation may be used to bring the laptop back to full power mode from a sleep or suspended mode.

In other applications, the laptop may further process the presence detection to determine specific movements performed by the user. For example, the user may make certain hand gestures in the vicinity of the laptop that may be used to indicate commands by the user for the laptop. Thus, instead of detecting merely the presence or absence of a person, it may determine more specific and precise movements by the user, thereby distinguishing hand gestures such as various hand waving motions or the number of time a person waves his or her hand. Such hand gestures may translate to screen scrolling commands, pan/zoom commands, or application launch commands, among others.

Figure 1:
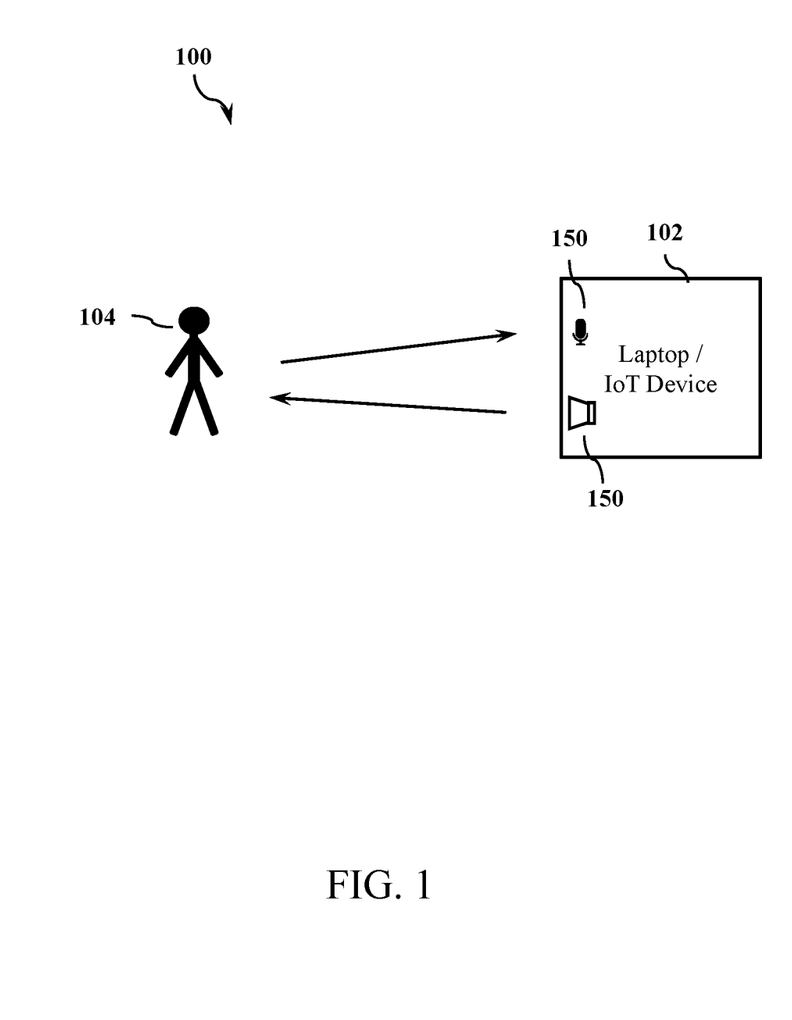
FIG. 1 is an illustration of an example movement and presence detection sonar system, according to an embodiment of the present disclosure.

FIG. 1 illustrates an example environment 100 of an example movement and presence detection sonar system, according to an embodiment of the present disclosure. The environment 100 includes a laptop 102 that has a built-in microphone 106 and a speaker 108 to detect the presence and movement of a user 104 within a predetermined vicinity of the laptop 102, according to an embodiment. Because the laptop 102 utilizes a standard built-in microphone 106 and speaker 108, additional expensive hardware is not needed and therefore, the system may be provided in a very inexpensive manner. In some embodiments, a native processor and operating system of the laptop 102 may be utilized to generate, emit, and process the ultrasonic signals all without interfering with the ability of the laptop 102 to use the microphone and/or the speakers simultaneously for other computing uses such as, for example, playing music or telecommunicating (e.g., video/audio chat). Thus, applications on the laptop 102 may playback music while simultaneously being able to emit the ultrasonic signals to detect the presence or movement by a user.

In some embodiments, the presence detection system uses an ultrasonic signal that is inaudible to human ears so that the emission of the signal does not bother the user or passersby. Generally, any frequency above about 16 kHz may be used because most human are unable to hear sounds in that range. Thus, the lowest frequency of the ultrasonic signal according to an embodiment of the present disclosure is set at about 16 kHz, and the upper end of the ultrasonic frequency is set based on hardware limitations of the electronic device, for example, about 24 kHz. In some embodiments, the performance of an audio codec built-in to the laptop, which may be capable of playing back and recording (or emitting and receiving) signals up to about 24 kHz, and therefore the ultrasonic signal is limited to 24 kHz. However, higher upper frequency range may be utilized, for example, 50 kHz or 60 kHz if the hardware is capable of handling such higher frequencies.

In some embodiments, certain frequencies or frequency ranges of the ultrasonic signal may interfere with other devices in the same room operating at the same frequencies. In such cases, the interfering frequencies or frequency ranges may be avoided by notching out and not emitting signals at those frequencies. For example, if a smart controller in the room operates using 19-20 kHz signals, then the presence detection application of the present disclosure may intentionally operate around those frequencies, for example, by notching out 19-20 kHz and instead, operating on 16-19 kHz and 20-24 kHz. In other embodiments where multiple ranges of frequencies of interferences exists, both frequency ranges may be notched out and not utilized. Thus, in some embodiments, the laptop can perform an initialization step where it determines whether there are any interference signals in the vicinity, e.g., in the room, by listening for signals with the speaker before emitting its own signals, and if it detects signals within the operating frequency range of the presence detection system, then those frequencies may be notched out.

In some embodiments, the presence detection system performs validity checks on the received reflected ultrasonic signal. If the reflected signals have interference signals mixed therein, the validity check would fail. Thus, if the validity checks consistently fail at certain frequencies, it may assume that there is an interfering signal around that particular frequency range and stop emitting, and thereby notching out that frequency range from the presence detection system.

In some embodiments, an initialization step may be performed to calibrate the latency of the signals in the operating environment. For example, when an ultrasonic signal is emitted, it takes a certain amount of time for the signal to reflect off of objects or things in the operating environment. Therefore, such latency may vary depending on the environment and the specific configuration or arrangement of the microphone and speaker on the laptop. The latency may be longer in a relatively larger relatively empty room where the signal has to travel farther before reflecting and returning. On the other hand, the latency may be shorter in a relatively smaller room or a room that has more objects or obstacles (e.g., furniture) where the signal may be reflect and return much sooner. In this manner, the latency of every electronic device (e.g., the laptop) may be calibrated based on its operating environment to obtain an accurate estimation of the latency.

According to an embodiment of the present disclosure, once the latency is determined and computed, software or firmware implemented in an audio codec, e.g., Synaptics chipset, can be configured to generate and repeatedly emit the ultrasonic signals (e.g., pings) through the laptop speakers. Such signals may be mixed into other audio streams that are being emitted through the same speakers, for example, music or video playback, telecommunications such as voice or video chat, etc. The codec may then be configured to receive audio signals through the built-in microphone and analyze the audio, which can include the reflected ultrasonic signals as well as the direct-path pickup of the signal that is being emitted by the speaker.

In some embodiments, the laptop may include a plurality of built-in speakers such that with further processing, spatial information of the person may be determined. For example, techniques may be implemented to determine the direction in which the person is facing relative to the laptop or further determine specific hand gestures by the person.

Figure 2:
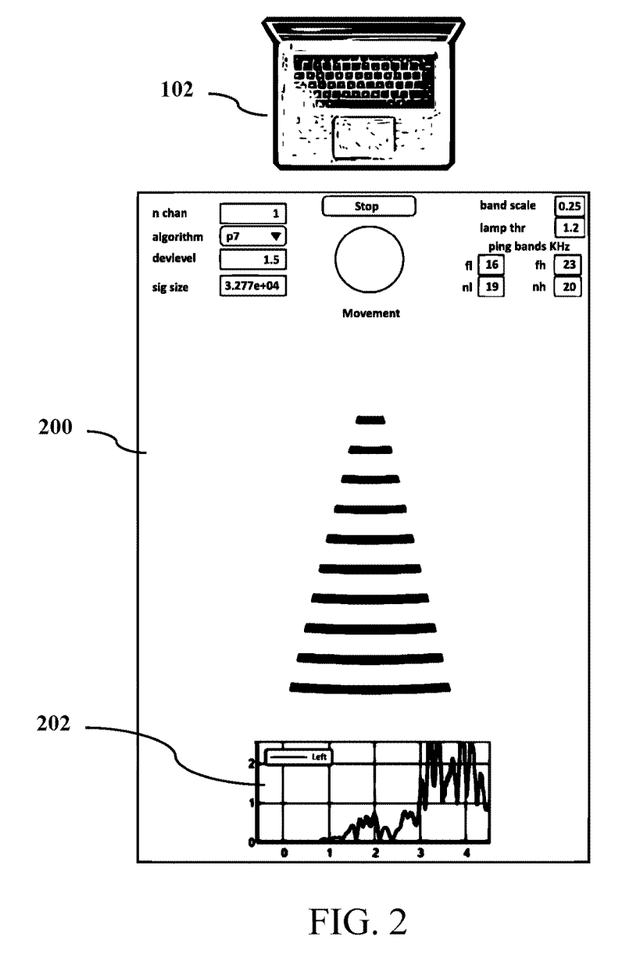
FIG. 2 is an example graphical user interface (GUI) that may be provided on a display of an electronic device, according to an embodiment of the present disclosure.

In some embodiments, the laptop 102 illustrated in FIG. 1 may include a touch screen or a display, a keyboard, and touchpad or mouse. The display may be configured to display a graphical user interface (GUI) 200, such as, for example, the one illustrated in FIG. 2. The GUI 200 may include a plot 202 that represents an object detection signal (e.g., reflected ultrasonic signal) showing the presence or movement of a person. The GUI 200 may further include a button to start or stop 204 the presence detection, the operating frequencies 206, and the notched out frequencies 208. It should be noted that the illustrated GUI 200 is provided as merely and example GUI and that other GUI designs may be envisaged.

Figure 3:
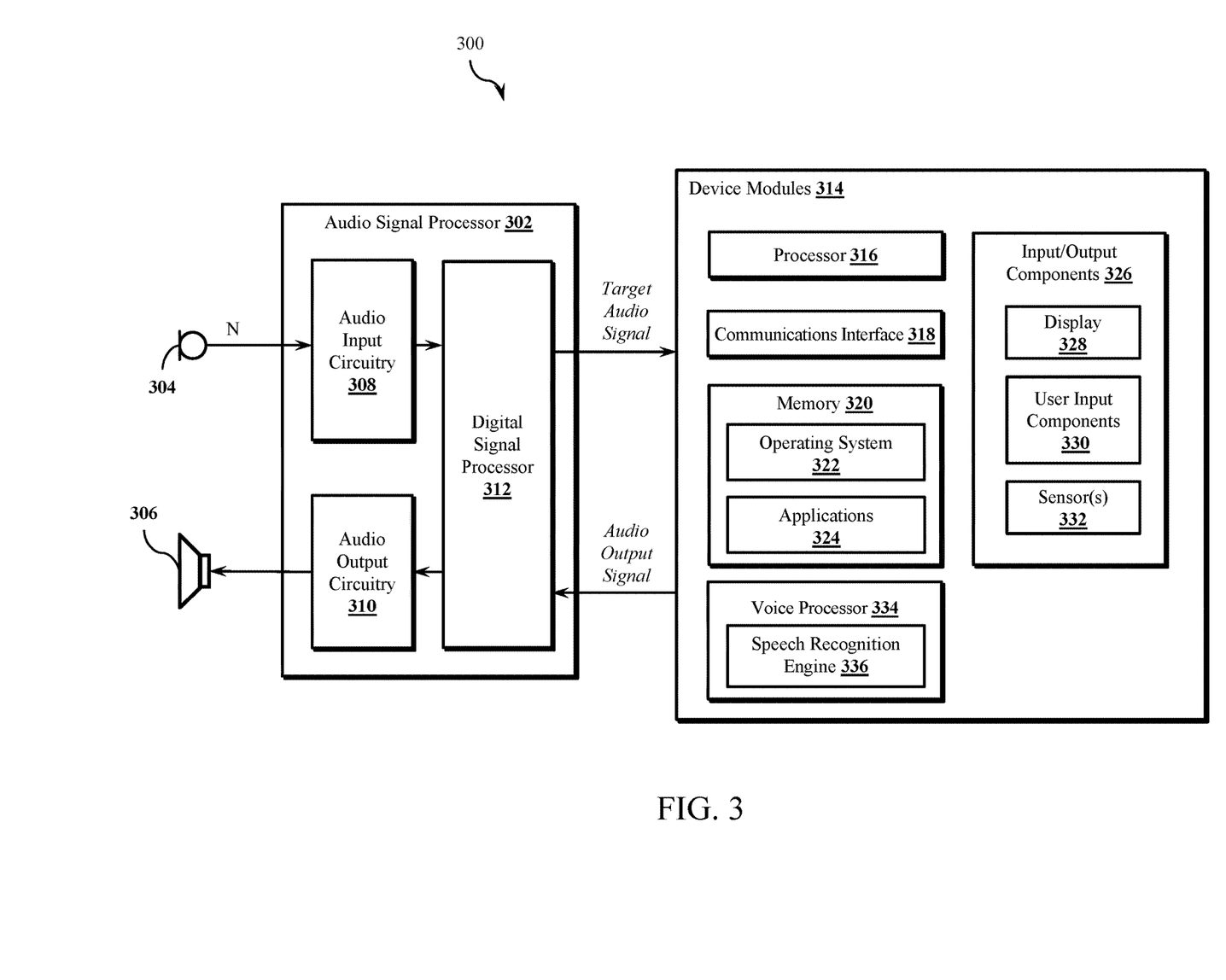
FIG. 3 is a block diagram of an example electronic device implementing the movement and presence detection sonar system, according to an embodiment of the present disclosure.

FIG. 3 illustrates an exemplary implementation of the presence and movement detection techniques implement on a system on chip (SOC) of an electronic device 300, according to various embodiments of the disclosure. In some embodiments, the device 300 may be implemented as the laptop 102 provided in FIG. 1. The device 300 includes a microphone 304, a speaker 306 (e.g., a loudspeaker) an audio signal processor 302, and device modules 314. In some embodiments, a plurality of microphones and a plurality of speakers may be included. The speaker 306 and the microphone 304 are a standard speaker and a standard microphone that is typically included and built-in to the laptop 102, having a frequency response range of about 200 Hz to 24 kHz.

The audio signal processor 302 includes an audio input circuitry 308, a digital signal processor 312, and an audio output circuitry 310. In various embodiments, the audio signal processor 302 may be implemented as an integrated circuit comprising analog circuitry, digital circuitry, and the digital signal processor 312, which is operable to execute program instructions stored in a firmware. The audio input circuitry 308, for example, may include anti-aliasing filters, analog-to-digital converter circuitry, echo cancellation circuitry, sound/noise discrimination circuitry, and other audio processing circuitry and components as disclosed herein. The digital signal processor 312 is operable to process a multichannel digital audio signal to generate an enhanced target audio signal, which is output to one or more of the device modules 314. In various embodiments, the digital signal processor 324 may be operable to perform sonar presence and movement detection, calibration sequences (e.g., latency estimation), echo cancellation, noise cancellation, target signal enhancement, post-filtering, and other audio signal processing functions. In some embodiments, the device modules 314 are configured to enter a low power mode (e.g., a sleep mode) during periods of inactivity, and the audio signal processor 302 is operable to wake up one or more of the device modules 314 when certain wake up criteria are met through sonar detection and signal processing.

The audio output circuitry 308 processes audio signals received from the digital signal processor 312 for output to the speaker 306. In various embodiments, the audio output circuitry 308 may include a digital-to-analog converter that converts one or more digital audio signals to analog and one or more amplifiers for driving the speaker 306.

The device 300 may be implemented as any sonar or voice-interaction system or apparatus such as, for example, a personal digital assistant, an intelligent voice assistant, a mobile phone, tablet, laptop computer, desktop computer, voice-interaction appliance, or smart controllers. The device modules 314 may comprise various hardware and software components for facilitating the operation of the device 300. In the illustrated embodiment, the device modules 314 include a processor 316, a communications interface 318 for communicating with external devices and networks, such as the Internet, the cloud, a local area network, or a cellular network and external devices (e.g., a mobile device), and a memory 320. The memory 320 may include an operating system 322, such as, Windows, iOS, or Unix operating system, and applications 324, such as music or video players, presence or motion detection applications, etc. The device 300 may further include input/output components 326.

The input/output components 326 may include a display 328 (e.g., for displaying the GUI 200 of FIG. 2), user input components 330, such as touchpad display, a keypad, one or more buttons, dials or knobs, and/or other input/output components operable to enable a user to directly interact with the device 300. The user input/output components 326 may also include one or more sensors 330 such as one or more image sensors (e.g., a camera) for capturing images and video.

The processor 316 and digital signal processor 312 may comprise one or more of a processor, a microprocessor, a single-core processor, a multi-core processor, a microcontroller, a programmable logic device (PLD) (e.g., field programmable gate array (FPGA)), a digital signal processing (DSP) device, or other logic device that may be configured, by hardwiring, executing software instructions, or a combination of both, to perform various operations discussed herein for embodiments of the disclosure. The device modules 314 are configured to interface and communicate with the audio signal processor 302 and the other device modules 314, such as through a bus or other electronic communications interface.

It will be appreciated that although the audio signal processor 302 and the device modules 314 are shown as incorporating a combination of hardware components, circuitry and software, in some embodiments, at least some or all of the functionalities that the hardware components and circuitries are operable to perform may be implemented as software modules being executed by the processor 316 and/or digital signal processor 312 in response to software instructions and/or configuration data, stored in the memory 320 or firmware of the digital signal processor 312.

The memory 320 and other memory components disclosed herein may be implemented as one or more memory devices operable to store data and information, including audio data and program instructions. Memory 320 may comprise one or more various types of memory devices including volatile and non-volatile memory devices, such as RAM (Random Access Memory), ROM (Read-Only Memory), EEPROM (Electrically-Erasable Read-Only Memory), flash memory, hard disk drive, and/or other types of memory. The processor 316 may be operable to execute software instructions stored in the memory 320 and other memory components.

The processor 316 may be operable to execute software instructions stored in the memory 320 and other memory components. In various embodiments, voice processor 334 may be implemented in hardware, software instructions executed by processor 316 or a combination of hardware and software. Voice processor 334 includes a speech recognition engine 336 operable to process the target audio signal received from the audio signal processor 302 to identify speech and detect trigger words and/or voice commands.

The communications interface 318 facilitates communication between the device 300 and external devices. For example, the communications interface 318 may enable Wi-Fi (e.g., 802.11) or Bluetooth connections between the device 300 and one or more local or external devices, such as a wireless router providing network access to a server through a network. In various embodiments, the communications interface 318 may include other wired and wireless communications components facilitating direct or indirect communications between the device 300 and one or more other devices.

Figure 4:
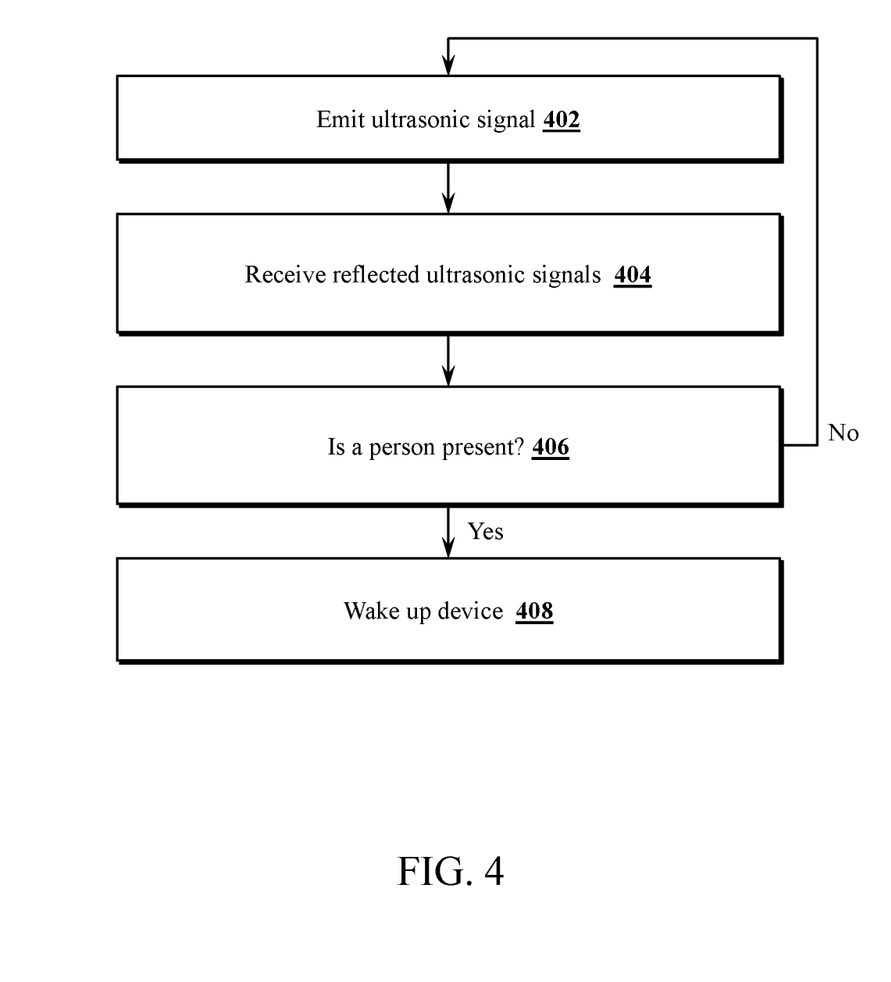
FIG. 4 is a flow chart illustrating an example operation of the movement and presence detection sonar system at a high level, according to an embodiment of the present disclosure.

FIG. 4 is a flow chart illustrating an example operation of the movement and presence detection sonar system at a high level, according to an embodiment of the present disclosure. As, provided, a speaker on the laptop computer emits a series of ultrasonic ping signals (402). The ultrasonic ping signals are emitted from the speaker into the environment. If a person is present within a set distance from the laptop, then the ping signals will reflect off the person and return to the speaker as a reflected ping signal (404). The reflected ultrasonic ping signal will have different characteristics than the reflected ping signal when a person is not in front of the laptop. Because the laptop is calibrated with the latency of the ping for a given laptop in a given environment, it can use this information to determine whether the person is present (404). If the person is present, then it will wake up to laptop from the sleep mode (406). If the person is not present, then the laptop will continue the sonar detection process of emitting and receiving the ping signals until it detects that a person is present, or the system is turned off.

Figure 5:
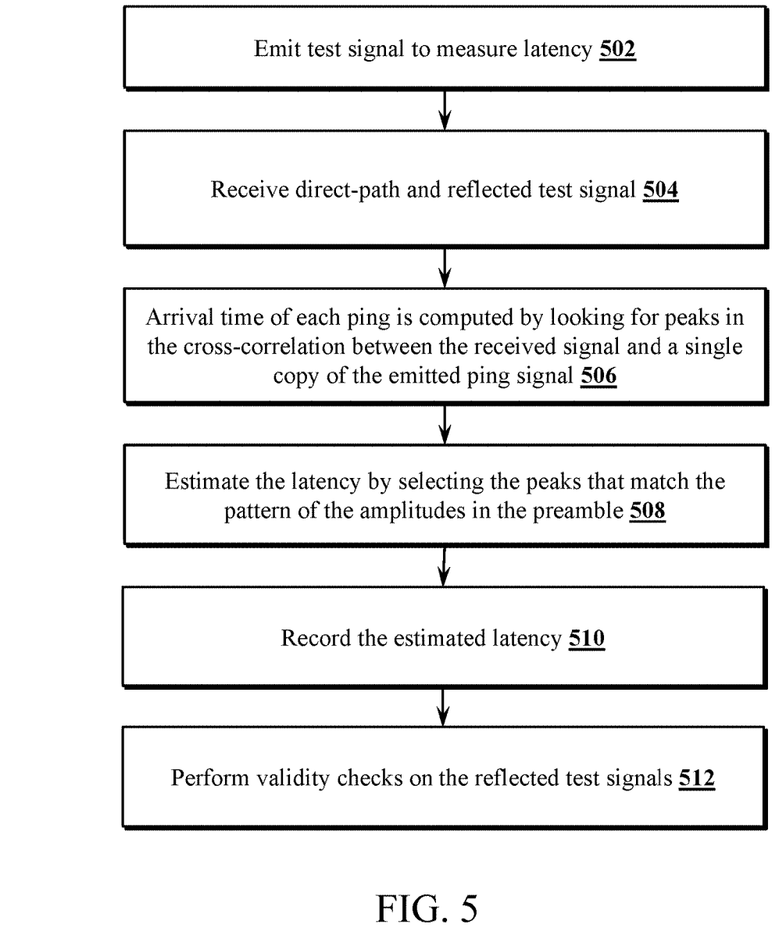
FIG. 5 is a flow chart illustrating an example operation of an initialization process of the movement and detection sonar system, according to an embodiment of the present disclosure.

FIG. 5 is a flow chart illustrating an example operation of an initialization process of the movement and detection sonar system, according to an embodiment of the present disclosure. Prior to activating the presence detection sonar system, the latency of the laptop in the operating environment is determined. In general, when playing and simultaneously recording a digital audio signal, there is a delay between the signal played and the signal recorded. This is due to time of travel of the signal in air based on the distance between the speaker and the microphone for direct-path pickup, buffering and other latency in the audio codec, and its driver software. This latency may not necessarily be known in advance and is therefore measured through an initialization step and recorded.

In some embodiments, a specially designed preamble including several repeated pings of low amplitude, followed by one ping of full amplitude, and several more pings of low amplitude are played through the speaker to measure the latency (502). Then, each ping signal is received (504) and an arrival time of each ping is computed by looking for peaks in the cross-correlation between the received signal and a single copy of the emitted ping signal in a matched filtering process (506). Various techniques may be used for the computation, however, a fast Fourier transform (FFT) and inverse fast Fourier transform (IFFT) provides for an efficient method of computation. Next, the peaks are selected which match the pattern of the amplitudes in the preamble that enables estimation of the latency to an accuracy of +/−1 sample (508). This latency is remembered and used in further processing (510). In some embodiments, validity checks may be performed on the test signals for validation of the signals (512).

In some embodiments, the ultrasonic ping signal is generated by the presence detection system for emission. According to one embodiment, a sine sweep signal is created, which implements a frequency-domain method described in Muller, Swen, "Transfer-Function Measurement with Sweeps," JAES 49:6 pp 443-471, June 2001, which is incorporated herein by reference in its entirety. The described technique is superior to time-domain generation of a sweep because it does not generate transients at the beginning and end of the sweep.

In some embodiments, the sine sweep signal is then filtered through a sharp-cutoff bandpass chebyshev filter, which may be designed for example, by using a Matlab filter design function, although other techniques may be contemplated. The lower frequency band limit is such that the signal is not audible to humans (e.g., 16-18 kHz) and the upper frequency limit is such that the Nyquist frequency of the audio codec is not exceeded (e.g., 23-24 kHz).

If there is expected to be an ultrasonic interfering signal in a known narrow band, a sharp-cutoff notch filter may be provided, which may be designed for example, using Matlab (e.g., an elliptic filter). For example, certain teleconference control panel may emit an ultrasonic beacon in the 19-20 kHz range. In this case, the sharp-cutoff notch filter may be applied to remove the frequencies within this band from the ultrasonic signal that is being generated and is therefore not emitted. Consequently, only the desired selected portion of the frequency remains.

Figure 6:
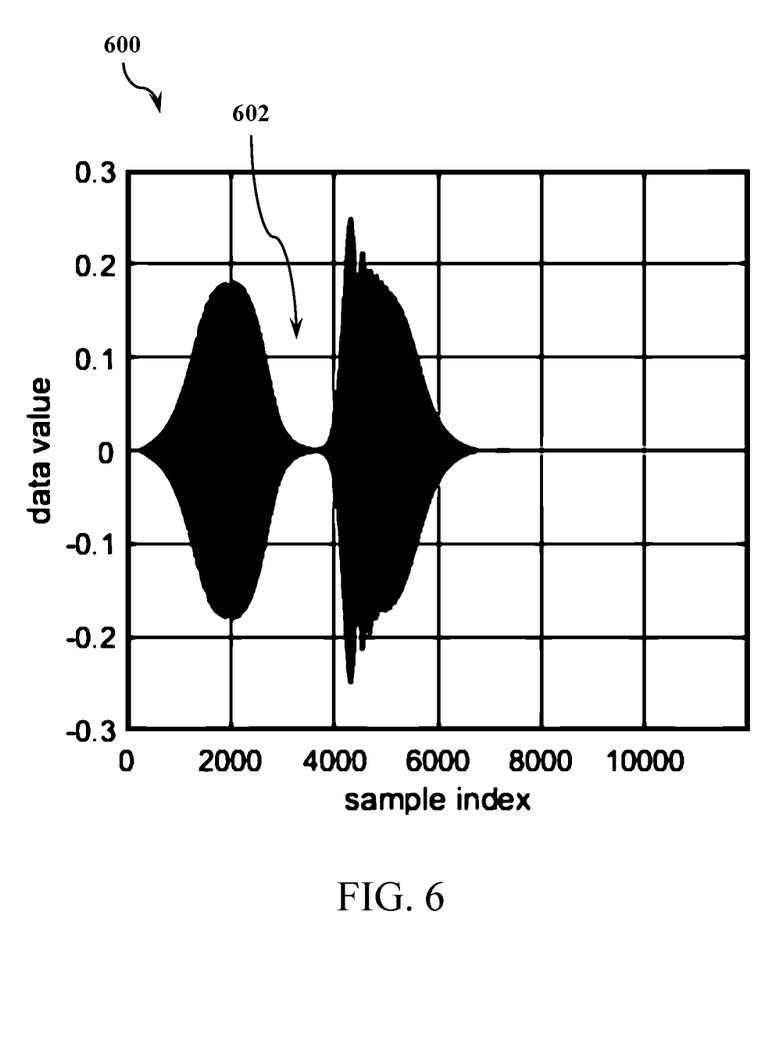
FIG. 6 illustrates an example plot of a generated ultrasonic ping signal, according to an embodiment of the present disclosure.

In some embodiments, the signal is cropped as short as possible without losing or sacrificing any of the needed frequencies, by calculating the earliest and latest times in the signal when the energy in the signal falls below a certain threshold number of dB (e.g., 30 dB) below the peak energy in the signal. A soft window may be used for the cropping, which has a quarter of a raised sine wave at each of its two ends. This is performed to eliminate, for example, any transients at the beginning and the end of the signal. FIG. 6 illustrates an example time-domain plot 600 of a generated ultrasonic ping signal, according to an embodiment of the present disclosure. As provided, the plot 600 of the sine sweep is about 12 milliseconds in length with a notch 602 at the filtered out frequency. In other embodiments, the signal may be longer or shorter, for example 10-15 milliseconds in length. In some embodiments, the emitted signals may have a normalized autocorrelation function that is close to 1.0 at zero delay and very low for non-zero delay.

Figure 7:
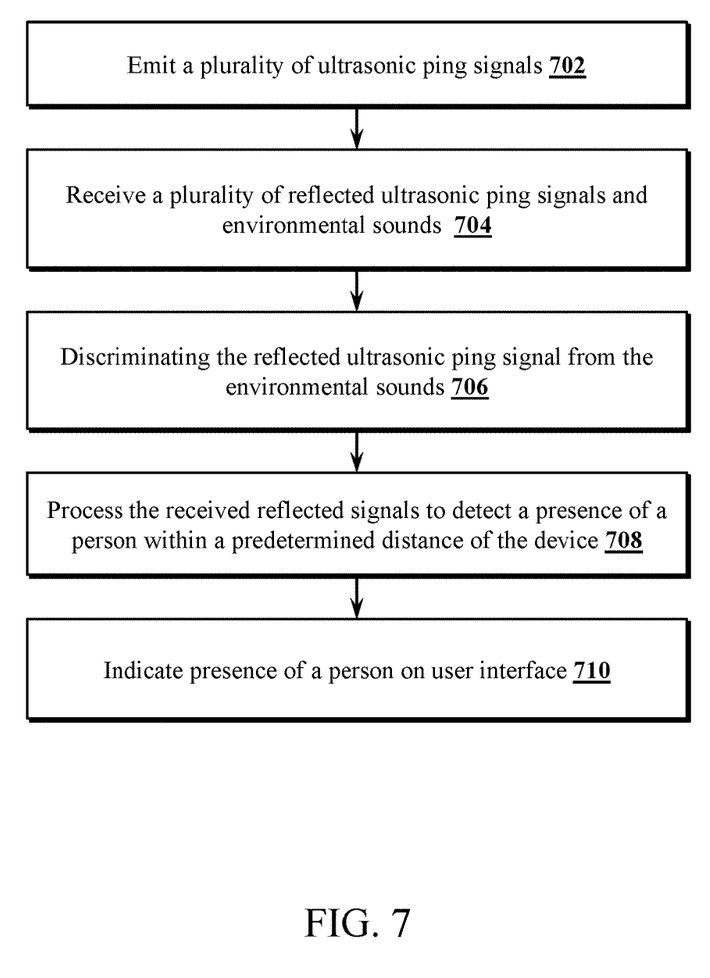
FIG. 7 is a flow chart illustrating an example operation of the movement and presence detection sonar system, according to an embodiment of the present disclosure.

Now turning to the flow chart of FIG. 7, the generated ultrasonic ping signal is emitted by the laptop speaker (702). In some embodiments, the ping signals may be repeatedly emitted, for example, 5-20 times per second, and the reflected ultrasonic ping signals are received by the microphone (704). Other environment sounds and/or noise may also be received by the microphone. In some embodiments, the reflected ultrasonic ping signals may be discriminated to filter out the environmental sounds in order to process the ultrasonic signal (706). Finally, the ultrasonic signal is processed to detect a presence of a person (708) and then indicate that a person is present via a user interface such as a GUI if a person is present (710).

Figure 8:
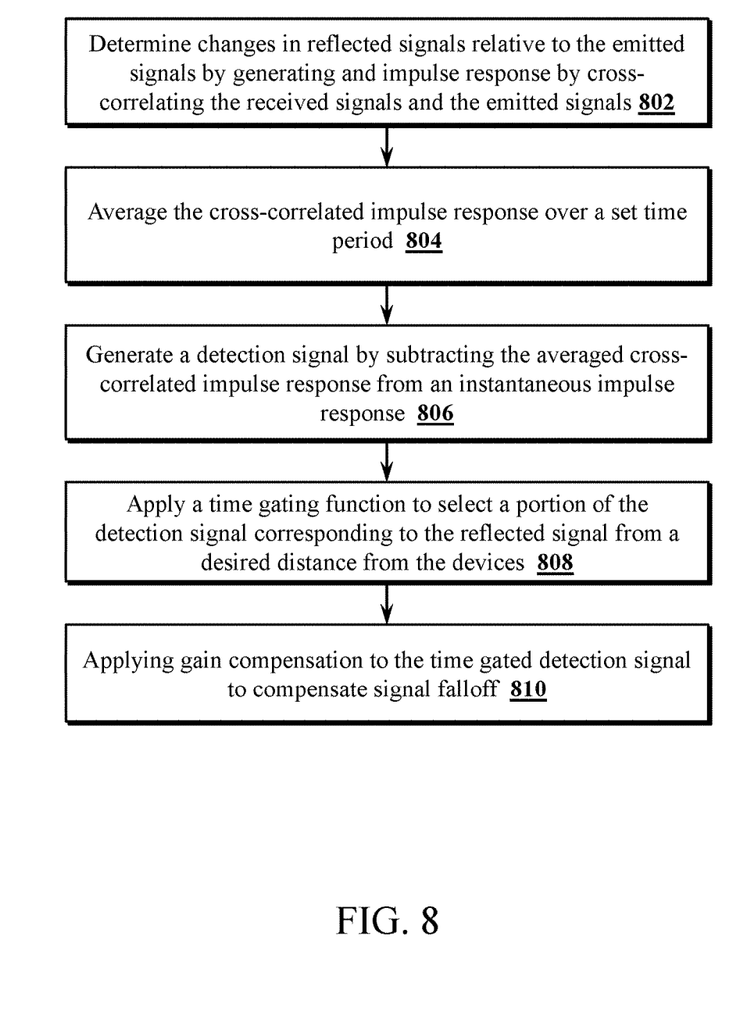
FIG. 8 is a flow chart illustrating an example operation for processing the reflected ultrasonic signals to determine a presence of a person, according to an embodiment of the present disclosure.

FIG. 8 is a flow chart illustrating an example operation for processing the reflected ultrasonic signals to determine a presence of a person in more detail, according to an embodiment of the present disclosure. According to an embodiment, a repeating train of full-amplitude ultrasonic pings is emitted and then received as reflected ultrasonic signals. The received signals are further processed to determine whether there are changes in the reflected signal relative to previously reflected signals. If there is a change, this may be an indication of a presence of a person (802). Using the latency previously estimated from the initialization process, the received signal corresponding to each emitted ping signal is extracted. According to an embodiment, this is processed by matched filtering, by averaging the cross-correlated impulse response over a set time period, which results in an estimate of the impulse response of the audio environment (804). The time period is based on the previously estimated latency. The impulse response may be implicitly filtered by the filters which were used in generating the ultrasonic ping signal. For example, it may contain information about the round-trip distance of any sonic reflectors in the vicinity of the emitter (e.g., speaker) and the receiver (e.g., microphone).

In some embodiments, the calculated impulse response may undergo validation tests to ensure its amplitude is within a set range (e.g., not too much or not too little) relative to the average amplitude of impulse responses recorded during the initialization preamble. If the validation test fails, further processing for this ping may be aborted.

A moving average of the recent (valid) impulse responses is maintained. In some embodiments, this is done by a decaying exponential average. The difference between the latest impulse response and the moving average computed to obtain an estimate of the recent changes in impulse response due to movement in the vicinity (806). In some embodiments, this signal is then rectified and low-pass filtered, and then time gated to eliminate time durations outside the times corresponding to the predetermined distance range (e.g., 1-3 feet) to generate a detection signal (808). In other words, only the reflected signals that correspond to the selected distance from the laptop is retained and considered because there is no interest in knowing whether a person is present outside of the selected distance range.

According to another embodiment of the present disclosure, a gain compensation function is applied to the time gated detection signal to compensate for the falloff of reflection intensity at greater distances (810). That is, a signal that is reflected from an object or a person at a greater distance will have a weaker reflected signal. Thus, the gain compensating function increases the amount of signal gain to certain portions of the detected signal. Such gain function is a function of time delay and may be jiggered by reducing it from linearity at farther distance based on empirical results. In some embodiments, the impulse response may be tested at each time delay against a threshold. If it exceeds the threshold at any delay, the system identifies this a detection event. Detection events are further processed through an integrator, and a second threshold with hysteresis to prevent flip flopping back and forth between detected and not detected conditions. That is, to avoid false presence detection, which may result from, for example, random vibrations of objects or small circulation of air current, various thresholds are applied. Furthermore, the thresholds also prevent falsely identifying loud impact sounds or loud ultrasonic sounds as presence of a person. After applying the thresholds, the resulting signal is the detection signal that is the binary output of the algorithm to indicate that a person was detected. More complicated processing is also possible if a graded output signal is desired.

In some embodiments, it is possible to play signals through more than one speaker and record through more than one microphone. The resulting multiple impulse responses contain information about the location and transverse movement of objects in the vicinity.

In other embodiments, the acoustic environment may be recorded for a set period of time before any pings are emitted, and in silent gaps between pings. If an ultrasonic interfering signal is present, and if the bandwidth is narrow, an additional notch filter may be incorporated in the generation of a new signal, which thereby would be resistant to this interfering signal.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as program code and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Embodiments described herein are exemplary only. One skilled in the art may recognize various alternative embodiments from those specifically disclosed. Those alternative embodiments are also intended to be within the scope of this disclosure. As such, the embodiments are limited only by the following claims and their equivalents.

The invention claimed is:

1. A method for detecting presence of a person, comprising:
   emitting, by a speaker of a device, a plurality of ultrasonic ping signals;
   receiving, by a microphone of the device, a plurality of reflected ultrasonic ping signals; and
   processing the received reflected signals to determine a presence of a person within a predetermined distance of the device, wherein the processing comprises:
      determining changes in the reflected signals relative to the emitted signals by:
         generating an impulse response by cross-correlating the received signals and the emitted signals;
         averaging the cross-correlated impulse response over a set time period; and
         generating a detection signal by subtracting the averaged cross-correlated impulse response from an instantaneous impulse response;
      applying a time gating function to select a portion of the detection signal corresponding to the reflected signal from the predetermined distance from the device; and
      applying gain compensation to the time gated detection signal to compensate signal falloff.

2. The method of claim 1, further comprising providing an indication that a person is present within the predetermined distance of the device in response to the gain compensated signal being within a set threshold.

3. The method of claim 1, wherein the cross-correlating the received signals and the emitted signals comprises matched filtering.

4. The method of claim 1, wherein the impulse response comprises signals reflected from the person and objects in the environment.

5. The method of claim 1, wherein the averaging the cross-correlated impulse response comprises exponential decay averaging.

6. The method of claim 1, wherein the plurality of ultrasonic ping signals is a sine sweep signal comprising about 5 to about 20 pings per second, has a frequency of about 15 to about 24 kHz, and each ping is about 10 to about 15 milliseconds.

7. The method of claim 6, further comprising filtering the sine sweep signal through a bandpass chebyshev filter.

8. The method of claim 1, further comprising:
   receiving, by the microphone, environmental sounds; and
   discriminating the reflected ultrasonic ping signal from the environmental sounds.

9. The method of claim 1, wherein the set time period of averaging the cross-correlated impulse response corresponds to a latency of the emitted signal to return as the reflected signal.

10. The method of claim 9, further comprising determining the latency by an initialization process, wherein the initialization process comprises:
    emitting an ultrasonic test signal;
    receiving the ultrasonic test signal reflected from objects in an environment of the device; and
    computing the reflected ultrasonic test signal to determine the latency.

11. A system, comprising:
    a non-transitory memory; and
    one or more hardware processors coupled to the non-transitory memory and configured to read instructions from the non-transitory memory to cause the system to perform operations comprising:
       emitting, by a speaker of a device, a plurality of ultrasonic ping signals;
       receiving, by a microphone of the device, a plurality of reflected ultrasonic ping signals; and
       processing the received reflected signals to determine a presence of a person within a predetermined distance of the device, wherein the processing comprises:
          determining changes in the reflected signals relative to the emitted signals by:
             generating an impulse response by cross-correlating the received signals and the emitted signals;
             averaging the cross-correlated impulse response over a set time period; and
             generating a detection signal by subtracting the averaged cross-correlated impulse response from an instantaneous impulse response;

applying a time gating function to select a portion of the detection signal corresponding to the reflected signal from the predetermined distance from the device; and applying gain compensation to the time gated detection signal to compensate signal falloff.

12. The system of claim 11, wherein the processing the received reflected ultrasonic ping signals further comprises providing an indication that a person is present within the predetermined distance of the device in response to the gain compensated signal being with a set threshold.

13. The system of claim 11, wherein the cross-correlating the received signals and the emitted signals comprises matched filtering.

14. The system of claim 11, wherein the impulse response comprises signals reflected from the person and objects in the environment.

15. The system of claim 11, wherein the averaging the cross-correlated impulse response comprises exponential decay averaging.

16. The system of claim 11, wherein the plurality of ultrasonic ping signals is a sine sweep signal comprising about 5 to about 20 pings per second, has a frequency of about 15 to about 24 kHz, and each ping is about 10 to about 15 milliseconds.

17. The system of claim 16, wherein the operations further comprise filtering the sine sweep signal through a bandpass chebyshev filter.

18. The system of claim 11, wherein the operations further comprise:
  receiving, by the microphone, environmental sounds; and
  discriminating the reflected ultrasonic ping signal from the environmental sounds.

19. The system of claim 11, wherein the set time period of averaging the cross-correlated impulse response corresponds to a latency of the emitted signal to return as the reflected signal.

20. The system of claim 19, wherein the operations further comprises determining the latency by an initialization process, wherein the initialization process comprises:
  emitting an ultrasonic test signal;
  receiving the ultrasonic test signal reflected from objects in an environment of the device; and
  computing the reflected ultrasonic test signal to determine the latency.

* * * * *